(12) United States Patent
Bu

(10) Patent No.: US 10,712,016 B2
(45) Date of Patent: Jul. 14, 2020

(54) ROTATABLE MULTI-FUNCTIONAL REFLECTION HEATING PLATE STRUCTURE

(71) Applicant: GUANGDONG HUIJUN TECHNOLOGY GROUP LIMITED, Guangdong (CN)

(72) Inventor: Wenjun Bu, Guangdong (CN)

( * ) Notice: Subject to any disclaimer, the term of this patent is extended or adjusted under 35 U.S.C. 154(b) by 359 days.

(21) Appl. No.: 15/660,896

(22) Filed: Jul. 26, 2017

(65) Prior Publication Data

US 2018/0363915 A1 Dec. 20, 2018

(30) Foreign Application Priority Data

Jun. 15, 2017 (CN) .................... 2017 2 0697704 U

(51) Int. Cl.
*A47J 37/06* (2006.01)
*F24C 7/06* (2006.01)

(52) U.S. Cl.
CPC ........... *F24C 7/065* (2013.01); *A47J 37/0635* (2013.01)

(58) Field of Classification Search
CPC .............. A47J 36/2488; A47J 37/0635; A47J 37/0652; A47J 37/0682; F24C 3/128; F24C 3/087; F24C 15/22; F24C 7/065
See application file for complete search history.

(56) References Cited

U.S. PATENT DOCUMENTS

| 2004/0226937 A1* | 11/2004 | DeWitt | H05B 3/0076 219/451.1 |
| 2006/0048769 A1* | 3/2006 | Lu | A47J 37/0652 126/273 R |
| 2008/0083727 A1* | 4/2008 | Zank | F24C 7/065 219/390 |

* cited by examiner

*Primary Examiner* — Brian W Jennison
(74) *Attorney, Agent, or Firm* — Prakash Nama; Global IP Services, PLLC

(57) ABSTRACT

The invention discloses a rotatable multi-functional reflection heating plate structure, comprising a heating component, wherein a reflector is disposed above the heating component; the reflector is connected with a household appliance through a rotating shaft; the reflector rotates around the rotating shaft; the heating component consists of a heating plate, an electrical heating pipe and a fixed board; the fixed board is fixedly connected with the household appliance; the heating plate is disposed above the fixed board; and the electrical heating pipe is disposed in the gap between the heating plate and the fixed board. In the invention, the reflector is fixed above the heating component using the rotating shaft, so the reflector does not fall down because of loose fixation; the heating component plays a good heat reflecting role, so foods can be roasted quickly; meanwhile, the assembling structure is simple and the cost is low.

5 Claims, 3 Drawing Sheets

ROTATABLE MULTI-FUNCTIONAL REFLECTION HEATING PLATE STRUCTURE

BACKGROUND OF THE INVENTION

The invention relates to the field of kitchen household appliances, specifically to a rotatable multi-functional reflection heating plate structure.

The majority of kitchen household appliances are used for heating foods. For example, steam ovens are a kind of electrical heating device for baking sliced bread or foods. The working principle of the oven is as follows: To bake sliced bread or foods, the sliced bread or foods are placed in the oven first and then supported by a grill in the oven; baking time and temperature are set by respectively rotating a timer and a temperature knob; then the oven starts heating while generating steam; after the preset time is up, the timer returns to zero, and bread or food baking is completed.

The majority of the existing ovens have reflectors directly placed above heating plate structure without being fixed, so the reflectors tend to fall down, thus affecting the food baking result and taste; and, potential safety hazards are easily generated due to falling of the reflector.

The aforementioned defects need solving.

BRIEF SUMMARY OF THE INVENTION

In order to overcome defects in the prior art, the invention provides a rotatable multi-functional reflection heating plate structure.

The technical solution of the invention is as follows:

A rotatable multi-functional reflection heating plate structure is characterized by comprising a heating component, wherein a reflector is disposed above the heating component; the reflector is connected with a household appliance through a rotating shaft; the reflector rotates around the rotating shaft; the heating component consists of a heating plate, an electrical heating pipe and a fixed board; the fixed board is fixedly connected with the household appliance; the heating plate is disposed above the fixed board; and the electrical heating pipe is disposed in the gap between the heating plate and the fixed board.

The invention employing the above solution is characterized in that the reflector is wrapped on the outer periphery of the heating component.

The invention employing the above solution is characterized in that the heating component is disposed between a left inner board and a right inner board of the household appliance.

Further, a grill is disposed between the left inner board and the right inner board, and the heating component is disposed below the grill.

The invention employing the above solution is characterized in that the reflector and the rotating shaft are both connected with the interior of the household appliance in a fastened way.

The invention employing the above solution has the following beneficial effects: The reflector is fixed above the heating component using the rotating shaft in this invention, so the reflector does fall down because of loose fixation when customers are moving or cleaning steam oven products; and when performing heating, the oven product obtains a good heat reflecting effect, so foods can be roasted soon, thus avoiding the potential safety hazard generated by falling of the reflector when the oven product is working or is being moved; meanwhile, the invention has a simple assembling structure and is low in cost.

DETAILED DESCRIPTION OF THE INVENTION

The invention is further described below in conjunction with the attached drawings and specific embodiments.

Figure 1:
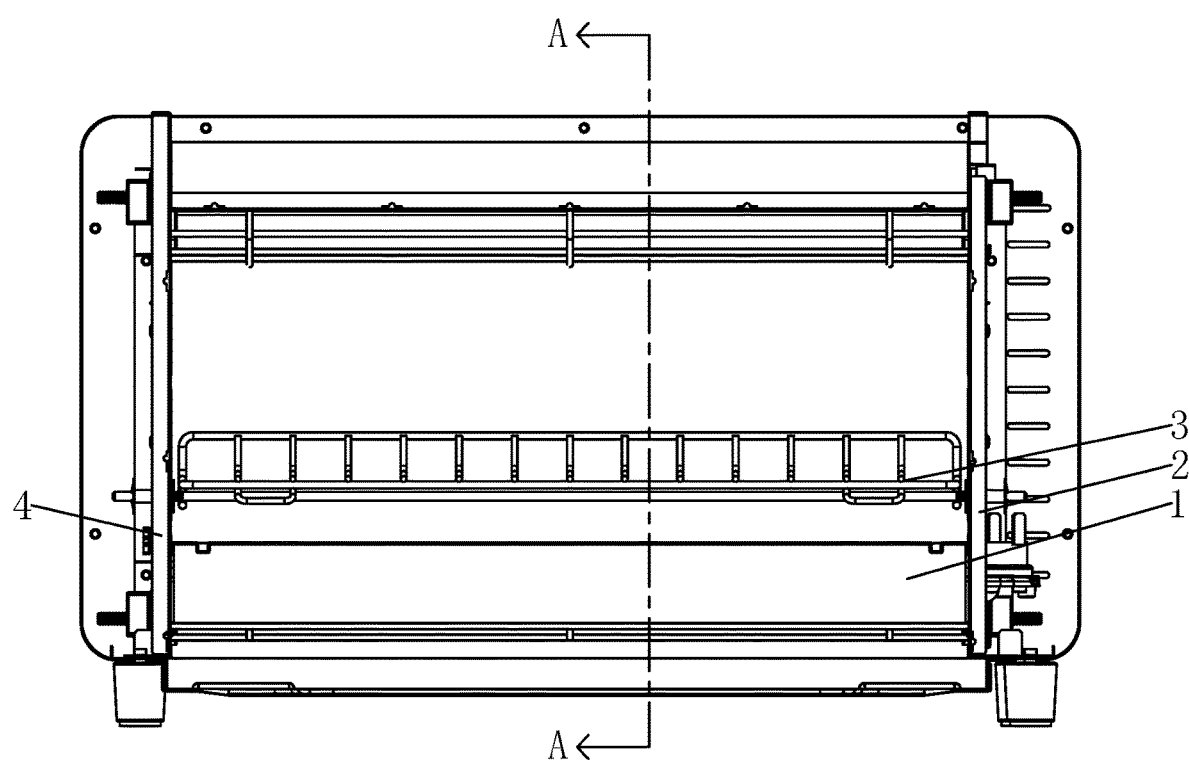
FIG. 1 is a structural view of the invention.

As shown in FIG. 1, a rotatable multi-functional reflection heating plate structure includes a heating component; the heating component is disposed between a left inner board 4 and a right inner board 2 in a household appliance; a grill 3 is disposed between the left inner board 4 and the right inner board 2; and the heating component is disposed below the grill 3.

Figure 2:
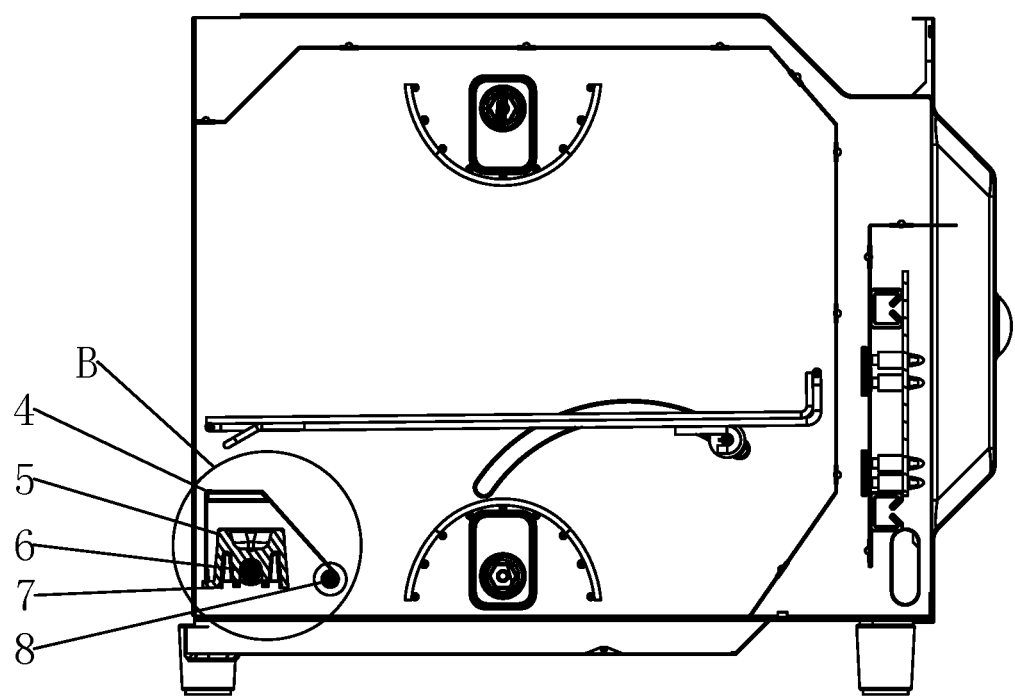
FIG. 2 is a sectional view of FIG. 1 in direction A-A.
Figure 3:
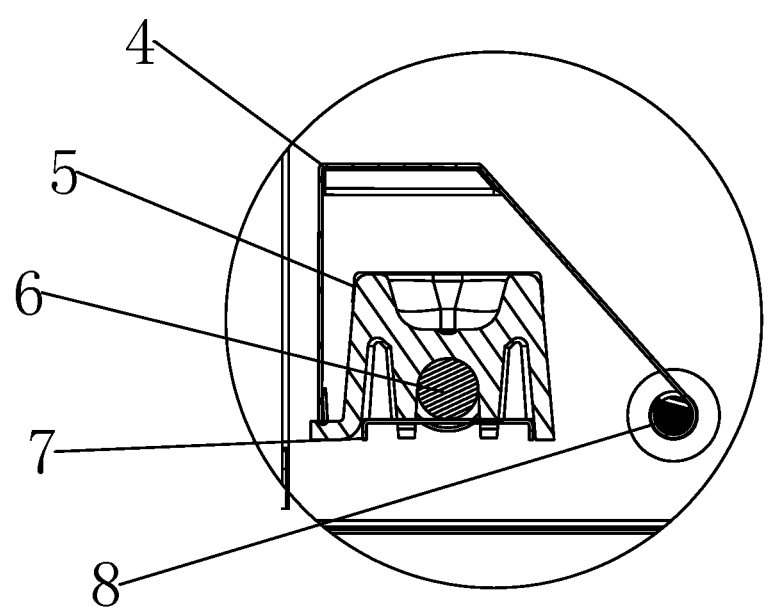
FIG. 3 is an amplified view of portion B in FIG. 2.
As shown in the Figures: 1. reflector; 2. right inner board; 3. grill; 4. left inner board; 5. heating plate; 6. electrical heating pipe; 7. fixed board; 8. rotating shaft.

As shown in FIG. 2 and FIG. 3, a reflector 1 is disposed above the heating component; the reflector 1 is connected with the left inner board 4 and the right inner board 2 of the house electrical appliance through a rotating shaft 8; the reflector 1 rotates around the rotating shaft 8; the heating component consists of a heating plate 5, an electrical heating pipe 6 and a fixed board 7; the fixed board 7 is fixedly connected with the left inner board 4 and the right inner board 2; the heating plate 5 is disposed above the fixed board 7; and the electrical heating pipe 6 is disposed in the gap between the heating plate 5 and the fixed board 7.

In this embodiment, the cross section of the reflector 1 is shaped as a trapezoid with the lower side opened, and the reflector 1 is wrapped on the outer periphery of the heating component. Preferably, the reflector 1 and the rotating shaft 8 are both connected with the interior of the household appliance in a fastened way, facilitating washing and adjusting.

In this embodiment, only one set of reflector 1 and heating board 5 is available. However, in other embodiments, the number of the set of reflector 1 and heating board 5 is not limited to one, and can be greater than one. Moreover, the whole set of heating and fixing structure is not only applicable to oven products, but also applicable to electrical heating type household appliances such as toasters, frying and grilling products.

It should be understood that, for those ordinarily skilled in the art, improvements and changes can be made on the basis of the above description, and all the improvements and changes should fall within the protective scope of the claims of the invention.

The invention is described above in an exemplary way in conjunction with the attached drawings. Obviously, the implementation of the invention is not limited to the above description. Various improvements made on the basis of the concept and technical solution of the invention or direct applications of the concept and technical solution of the invention to other occasions without improvements should fall within the technical scope of the invention.

What is claimed is:
1. A rotatable, multi-functional reflection heating plate structure, adapted to be used in a household electrical appliance that contains at least a left inner board and a right inner board; wherein the rotatable multi-functional reflection heating plate structure comprises a heating component comprising a heating plate, an electrical heating pipe and a fixed board, wherein a reflector is disposed above the heating component; the reflector is connected with the left inner board and the right inner board of the household electrical appliance through a rotating shaft independent from the heating component; the reflector rotates around the rotating shaft; the fixed board is fixedly connected with the household electrical appliance; the heating plate is disposed above the fixed board; and the electrical heating pipe is disposed in the gap between the heating plate and the fixed board.

2. The rotatable multi-functional reflection heating plate structure according to claim 1, characterized in that the reflector is wrapped on an outer periphery of the heating component.

3. The rotatable multi-functional reflection heating plate structure according to claim 1, characterized in that the heating component is disposed between the left inner board and the right inner board of the household electrical appliance.

4. The rotatable multi-functional reflection heating plate structure according to claim 3, characterized in that a grill is disposed between the left inner board and the right inner board, and the heating component is disposed below the grill.

5. The rotatable multi-functional reflection heating plate structure according to claim 1, characterized in that the reflector and the rotating shaft are both connected with the interior of the household electrical appliance in a fastened way.

* * * * *